United States Patent Office 3,761,251
Patented Sept. 25, 1973

3,761,251
PROCESS FOR PREVENTING AGGLOMERATION OF CADMIUM IN SOLUTION
Bruno Orlandini, Kellogg, Idaho, assignor to The Bunker Hill Company, Kellogg, Idaho
No Drawing. Continuation of abandoned application Ser. No. 729,439, May 15, 1968. This application Apr. 21, 1971, Ser. No. 136,210
Int. Cl. C22b 17/04, 19/06; C23b 5/12
U.S. Cl. 75—109                                                         1 Claim

ABSTRACT OF THE DISCLOSURE

The disclosure describes a process for controlling the agglomeration of cadmium precipitate particles during the purification of a zinc sulfate solution to prevent the build-up of large balls of cadmium particles which may damage the processing equipment. The control is provided by the addition of small amounts of solution soluble sulphurous acid generating material to a leach solution. Materials such as sulphurous acid, sulphur dioxide, and sodium sulphite are included in the sulphurous acid generating material that are capable of controlling the agglomeration of cadmium particles.

RELATED APPLICATIONS

This is a continuation application of an application filed May 15, 1968, having Ser. No. 729,439, now bandoned.

BACKGROUND OF THE INVENTION

This process relates to processes for precipitating cadmium from zinc sulfate solutions and more particularly to processes for preventing the agglomeration of cadmium particles as the cadmium is being precipitated in zinc sulfate solutions associated with the electrolytic recovery of zinc.

Zinc sulfide ore generally has various concentrations of other metals including iron, copper, cobalt, arsenic, cadmium and antimony. During the process of refining the zinc ore to obtain substantially pure zinc (electrolytic) it is necessary to separate the other metals including cadmium from the zinc. After the ore is roasted to form zinc calcine the ore is generally subjected to a sulfuric acid leach to dissolve much of the zinc. The leach solution also dissolves several of the cadmium compounds rendering it necessary to pass the zinc leach solution through a zinc dust purification stage to precipitate the cadmium from the zinc solution. A continuous process for purifying the zinc calcine leach solution is described in a copending application Ser. No. 679,815.

Cadmium is generally found in a concentration of between ½ gram to 1 gram per liter in the zinc sulfate filtrate solution. The removal of the cadmium from the zinc calcine filtrate solution has presented several problems. One of the most perplexing problems is the tendency of the metallic cadmium precipitate to agglomerate into large spherical hard cadmium balls which damage the filtration system and frequently requires the shutting down of the process and the cleaning of the filtration system and the associated piping and tanks. This becomes quite costly and inefficient.

This problem is further accented in the associated cadmium recovery plant in which the cadmium concentrations are much larger and generally range between 50 grams and 150 grams per liter of solution. The hard cadmium balls sometimes reach the size of oranges and grapefruit. One can readily appreciate the problem involved when such large balls are formed and the necessity of shutting down the operation to remove the cadmium balls from the system.

This problem becomes particularly acute and has presented serious problems in efforts to develop commercially acceptable continuous processes for purifying zinc and for recovering cadmium from leach solutions.

One of the principal objects of this invention is to provide a process for efficiently controlling the size of cadmium precipitate particles and preventing the cadmium precipitate from agglomerating into sizable balls.

An additional object of this invention is to provide a process for preventing the agglomeration of cadmium particles without adversely affecting the precipitation of cadmium from the solution.

A further object of this invention is to provide a process for preventing the agglomeration of cadmium precipitate in a zinc purification system without adversely affecting subsequent purification of the zinc solution and the recovery of the zinc by the electrolytic process.

An additional object of this invention is to provide a process for preventing the agglomeration of cadmium precipitate without forming non-filterable cadmium compounds.

A still further object of this invention is to provide an economical process for controlling the size of cadmium precipitate particles.

These and other objects and advantages of this invention will become apparent upon the reading of the following detailed description of a preferred embodiment.

DETAILED DESCRIPTION OF A PREFERRED EMBODIMENT

It has been found that the addition of a small amount of solution soluble sulphurous acid generating material to the zinc sulfate leach solution substantially less than the stoichiometric equivalent based upon the cadmium concentration prevents the formation of the cadmium balls as the metallic cadmium is being precipitated and controls the particle size of the cadmium precipitate so that the cadmium can be easily and efficiently filtered and removed from the solution.

Although it is difficult to determine with any substantial precision, it is believed that the sulphurous acid generating material forms an elementary sulphur coating about the cadmium particles thereby preventing the agglomeration of the cadmium particles.

Sulphurous acid ($H_2SO_3$) and sodium sulphite ($Na_2SO_3$) have been effectively utilized for this purpose. During one experiment 0.185 gram of sodium sulphite per liter of leach solution was added to the leach solution to successfully eliminate the buildup of cadmium precipitate balls. This is equal to the additional 94 milligrams of $SO_2$ or equivalent per liter of solution $$\left(.185 \text{ g./l.} \times \frac{64}{126.06} \times 1000 \text{ mg./g.} = 94 \text{ mg./l.}\right)$$

During a second experiment 0.02 lb. of $SO_2$ from sulphurous acid was added per volume ton of leach solution to successfully prevent the formation of cadmium balls in the leach solution. This is equal to the addition of 10 milligrams of $SO_2$ or equivalent per liter of solution $$\left(\frac{0.02 \text{ lb.}}{907 \text{ l./v. ton}} \times 454 \text{ g./lb.} \times 1000 \text{ mg./g.} = 10 \text{ mg./l.}\right)$$

The cadmium precipitate is generally filtered from the zinc leach solution and further processed to recover the cadmium at the cadmium plant. At the cadmium plant the cadmium material is leached by sulphuric acid to dissolve the cadmium. The cadmium concentration in the cadmium plant leach solution is generally between 50 grams to 150 grams per liter of acid leach solution. The cadmium is then precipitated so that the cadmium concentration remaining in the solution falls to less than 0.1 gram per liter of solution. This means that more than 99% of the cadmium in the solution precipitates. It has been found that the addition of small amounts of solution soluble sulphurous acid materials to the zinc sulphate leach solution eliminates the tendency of the cadmium particles to agglomerate without decreasing the efficiency of the precipitation process. In one experiment, 3 lbs. of sodium sulphite ($Na_2SO_3$) for each 2500 pounds of cadmium to be precipitated was added to the leach solution. This is equal to the addition of 0.61 milligram of $SO_2$ or equivalent per gram of cadmium impurity in the solution $$\left(\frac{3 \text{ lb.}}{2500 \text{ lb.}} \times \frac{64}{126.06} \times 1000 \text{ mg./g.} = 0.61 \text{ mg./g.}\right)$$

This small addition of sodium sulphite prevented the agglomeration of the cadmium particles.

Other soluble sulphurous acid materials such as zinc sulphite, and potassium sulphite may be used depending upon the circumstances.

It should be appreciated that the above described embodiment is simply illustrative and that several other embodiments may be easily devised without deviating from the principle of this invention. Therefore, only the following claim is intended to define this invention.

What is claimed is:

1. In a process for removing metallic cadmium from a cadmium bearing sulphate leach solution, in which the metallic cadmium is precipitated in the solution by the addition of zinc dust to form cadmium particles that have a tendency to agglomerate together to form cadmium balls, wherein the improvement comprises preventing the agglomeration of the precipitated cadmium particles in which a solution soluble sulphurous acid generating material selected from the group consisting of sulphurous acid, sulphur dioxide, sodium sulphite, potassium sulphite and zinc sulphite is added to the leach solution in a small amount which is substantially less than the stoichiometric equivalent based upon the cadmium concentration in the zinc sulphate leach solution.

References Cited
UNITED STATES PATENTS

| | | | |
|---|---|---|---|
| 1,343,619 | 6/1920 | Elton et al. | 23—125 |
| 1,573,233 | 2/1926 | Eldridge | 23—125 |
| 3,218,161 | 11/1965 | Kunda et al. | 75—108 |

FREDERICK C. EDMUNDSON, Primary Examiner

U.S. Cl. X.R.

204—114; 423—106